(12) United States Patent
Meany

(10) Patent No.: US 8,027,547 B2
(45) Date of Patent: Sep. 27, 2011

(54) METHOD AND COMPUTER PROGRAM PRODUCT FOR COMPRESSING AND DECOMPRESSING IMAGERY DATA

(75) Inventor: James J. Meany, Des Peres, MO (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 993 days.

(21) Appl. No.: 11/836,543

(22) Filed: Aug. 9, 2007

(65) Prior Publication Data

US 2009/0041365 A1    Feb. 12, 2009

(51) Int. Cl.
*G06K 9/36* (2006.01)
*G06K 9/46* (2006.01)

(52) U.S. Cl. ......... 382/248; 382/232; 382/233; 382/240

(58) Field of Classification Search ................. 382/248, 382/240, 233, 232
See application file for complete search history.

(56) References Cited

U.S. PATENT DOCUMENTS

| | | | |
|---|---|---|---|
| 6,041,143 A * | 3/2000 | Chui et al. | 382/232 |
| 2005/0058354 A1 | 3/2005 | Weintraub et al. | |
| 2005/0119866 A1 * | 6/2005 | Zaleski | 702/189 |
| 2005/0175251 A1 * | 8/2005 | Taketa et al. | 382/248 |
| 2006/0029282 A1 | 2/2006 | Meeker | |
| 2006/0291733 A1 * | 12/2006 | Falzon et al. | 382/240 |
| 2007/0116118 A1 * | 5/2007 | Kostrzewski et al. | 375/240.12 |
| 2008/0037804 A1 * | 2/2008 | Shmunk | 381/96 |

FOREIGN PATENT DOCUMENTS

WO    WO 2005008886 A2 *    1/2005

OTHER PUBLICATIONS

O. Rioul, and M. Vetterli, "Wavelets and signal processing," *IEEE Signal Processing Magazine*, vol. 38, No. 4, pp. 14-37, Oct. 1991.
I. Daubechies, *Ten Lectures on Wavelets*, SIAM, Philadelphia, 1992.
B. Jawerth and W. Sweldens, "An Overview of Wavelet Based Multiresolution Analyses," *SIAM Review*, vol. 36, No. 3, pp. 377-412, 1994.
G. Strang and T. Nguyen, *Wavelets and Filter Banks*, Wellesley-Cambridge Press, Wellesley MA, 1996.

(Continued)

*Primary Examiner* — Bhavesh Mehta
*Assistant Examiner* — Bernard Krasnic
(74) *Attorney, Agent, or Firm* — Alston & Bird LLP

(57) ABSTRACT

Techniques are provided for compressing and decompressing image data which may reduce the distortion that may otherwise be created by the compression of data values representative of null posts, overlays or other features that differ from the underlying image. In compression, at least one coefficient generated by a forward wavelet transform may be replaced with respective replacement coefficients. The transformed image data is then subjected to an inverse wavelet transform to generate modified image data in which the data values which differ from the underlying image have been replaced by interpolated or extrapolated values. The modified image data may be compressed in accordance with wavelet-based image compression. Alternatively, wavelet image compression may be applied directly to the coefficients resulting from the modified forward wavelet transform. In decompression, the compressed image data may be decompressed and data values representative of null posts or other features may be replaced with their original values.

17 Claims, 12 Drawing Sheets

OTHER PUBLICATIONS

W. Sweldens, "Wavelets and the Lifting Scheme: A 5 Minute Tour," *Zeitschrift für Angewandte Mathematik and Mechanik*, vol. 76 (Suppl. 2), pp. 41-44, 1996.

R. C. Calderbank, I. Daubechies, W. Sweldens and Boon-Lock Yeo, "Wavelet Transforms That Map Integers to Integers," *Applied and Computational Harmonic Analysis (ACHA)*, vol. 5, No. 3, pp. 332-369, 1998.

I. Shah, O. Akiwumi-Assani, and B. Johnson, "A Chip Set for Lossless Image Compression," *IEEE Journal of Solid-State Circuits*, vol. 34, No. 4, pp. 30-44, 1991.

A. Said and W. Pearlman, "Reversible Image Compression via Multiresolution Representation and Predictive Coding," *Visual Communications and Image Processing*, vol. 2094, pp. 664-674, SPIE, 1993.

A. Zandi, J. D. Allen, E. L. Schwartz, and M. Boliek, "CREW: Compression with Reversible Embedded Wavelets," *Proceedings DCC '95, IEEE Data Compression Conference*, Snowbird, UT, pp. 212-221, Mar. 1995.

W. Sweldens, "The Lifting Scheme: A New Philosophy in Biorthogonal Wavelet Constructions," In A. F. Laine and M. Unser, editors, *Wavelet Applications in Signal and Image Processing III*, pp. 68-79, Proc. SPIE 2569, 1995.

I. Daubechies and W. Sweldens, "Factoring Wavelet Transforms into Lifting Steps," *Journal of Fourier Analysis Applications*, pp. 68-79, Proc. SPIE 2569, 1995.

\* cited by examiner

METHOD AND COMPUTER PROGRAM PRODUCT FOR COMPRESSING AND DECOMPRESSING IMAGERY DATA

FEDERALLY SPONSORED RESEARCH OR DEVELOPMENT

The invention was made with Government support under Contract No. N68936-02-C-0043 awarded by the Naval Air Warfare Center Weapons Division. The Government has certain rights in this invention.

FIELD OF THE INVENTION

Embodiments of the present invention relate generally to the compression and decompression of imagery data and, more particularly, to the compression and decompression of the imagery data in accordance with lossy wavelet-based compression and decompression techniques.

BACKGROUND OF THE INVENTION

In order to facilitate storage and transfer of imagery data, the imagery data must oftentimes be compressed. As such, various lossy compression techniques have been developed. For example, a number of lossy wavelet-based compression techniques utilizing wavelet transforms have emerged as promising alternatives to traditional spectral decompositions such as Fourier and cosine transforms. See, for example, G. Strang and T. Nguyen, *Wavelets and Filter Banks*, Wellesley-Cambridge Press, Welleslay Mass. (1996).

However, image data may sometimes include data values that are significantly different than the adjacent data values and are not representative of the underlying image. In regards to elevation data, such as that utilized by aircraft navigation programs, null posts are inserted in the image data to provide a default elevation for those locations for which actual elevation data is unavailable. In order to identify the null posts as a placeholder as opposed to an actual elevation value, null posts having an elevation value of −32,768 meters may be utilized since this elevation value otherwise never occurs. As another example, the image data representative of an image to be presented upon a computer monitor or other display, such as the image represented by a JPEG file may include a textual or graphical overlay that is defined by corresponding data values that differ significantly from the data values representative of the underlying image adjacent the textual or graphical overlay. In these instances, the lossy compression of the data values representative of the null posts, the textual or graphical overlays or other features that are distinct from the underlying image may cause distortion in the resulting image, i.e., the image following compression and then subsequent decompression. This distortion is due to quantization which may cause the data values representative of the null posts or graphical or textual overlays, for example, to deviate from their original value, thereby rendering it more difficult to properly identify each of these data values. For example, a data value representative of a null post may not be recognized as such a data value if its value has been perturbed from the pre-assigned value of −32,768. Additionally, the lossy compression of the data values representative of null posts, textual or graphical overlays or other features that are distinct from the underlying image may cause blurring and aliasing effects that cause the oftentimes extreme values of these data values to adversely effect the values of adjacent pixels which, therefore, disadvantageously alter the resulting decompressed image. As such, it would be desirable to provide a technique to permit more accurate reconstruction of image data following lossy wavelet-based compression even in instances in which the image data includes data values representative of a null post, an overlay or some other feature that is not included within the underlying image.

One technique for minimizing the distortion in the resulting images defines regions of interest that include those data values representative of null posts, overlays, or other features that differ from and are not a portion of the underlying image. Each region of interest may be compressed via a lossless compression technique in a manner distinct from the lossy wavelet-based compression to which the remainder of the image is subjected. While the resulting image will have less distortion, the use of lossless compression for the regions of interest reduces the amount of compression and therefore disadvantageously increases the size of the resulting image file. Accordingly, it would also be desirable to subject all of the image data to lossy wavelet-based compression so as to maintain relatively good compression performance while minimizing the distortion in the resulting image even in instances in which the image data includes null posts, overlays or other features that are not present in the underlying image.

BRIEF SUMMARY OF THE INVENTION

A method and computer program product are provided for compressing and decompressing image data in order to maintain desirable compression performance while reducing the distortion in the resulting image that may otherwise may be created by the compression of data values representative of null posts, overlays or other features that differ from and do not form a portion of the underlying image.

In one embodiment, a method and computer program product of preparing image data that includes a plurality of data values having respective locations for compression are provided. Initially, the locations of one or more data values of a first subset of data values are identified. This first subset may include those pixels representative of null posts, overlays or other features distinct from the underlying image. The image data is then subjected to a forward wavelet transform that generates transformed image data that includes at least one coefficient associated with each respective data value. Thereafter, the at least one coefficient associated with the one or more data values of the first subset may be replaced with respective replacement coefficients. The transformed image data including the replacement coefficients is then subjected to an inverse wavelet transform to generate modified image data. In one embodiment, the modified image data may then be compressed in accordance with lossy wavelet-based image compression.

In one embodiment, the replacement coefficients may be chosen so as to minimize the mean squared value for the replacement coefficients associated with the data values of the first subset and/or the at least one coefficient may be replaced with replacement coefficients determined by interpolation from other adjacent coefficients. Additionally, the forward wavelet transform may generate both detail coefficients and approximation coefficients. As such, the detail coefficient associated with an odd-indexed data value of the first subset may be replaced with a replacement coefficient of zero. The reduced or zero magnitudes for the replacement coefficients will in turn reduce the incidence of image artifacts associated with the quantization of these coefficients. In the special case where a replacement coefficient is zero, the quantization of the coefficient introduces no distortion into the reconstructed image since zero-valued coefficients are unchanged by quantization when using the deadzone quantizers employed in JPEG 2000 and other wavelet-based compression algorithms.

In another embodiment, the modified image data may be compressed using lossless wavelet-based image compression. While the use of lossless compression would prevent the occurrence of artifacts in relationship to null posts or other non-image content, it is common to use wavelet compressed imagery in a progressive or embedded fashion where a compressed file may be truncated to obtain a higher compression ratio result for the same image. This truncation practice can turn lossless compression results into lossy compression results. As such, the use of the modified image data in lossless compression will provide reduction of artifacts related to null posts and other pixels which are not part of the underlying image, if the lossless compression result is ever truncated to produce a lossy compression result.

In accordance with another aspect of the present invention, a method and computer program product for decompressing image data are provided. In this regard, original data values are identified for a first subset of data values. The original data values may be identified by providing a map of the original data values of the first subset as well as the respective locations of the original data values within the image data. In one embodiment, an encoded representation of the map is provided that is subsequently decoded in order to access the original data values. In addition to identifying the original data values, the method and computer program product of this aspect of the present invention also decompress the compressed representation of the image data in accordance with an inverse wavelet transform, such as in accordance with a wavelet-based decompression technique. Thereafter, respective locations of the data values of the first subset are identified such that the data values of the first subset can be replaced with the respective original data values. As such, the image can be reconstructed and the data values representative of the null posts, overlays or other features distinct from the underlying image can be reinserted without any degradation as a result of the intervening compression and decompression.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 9:
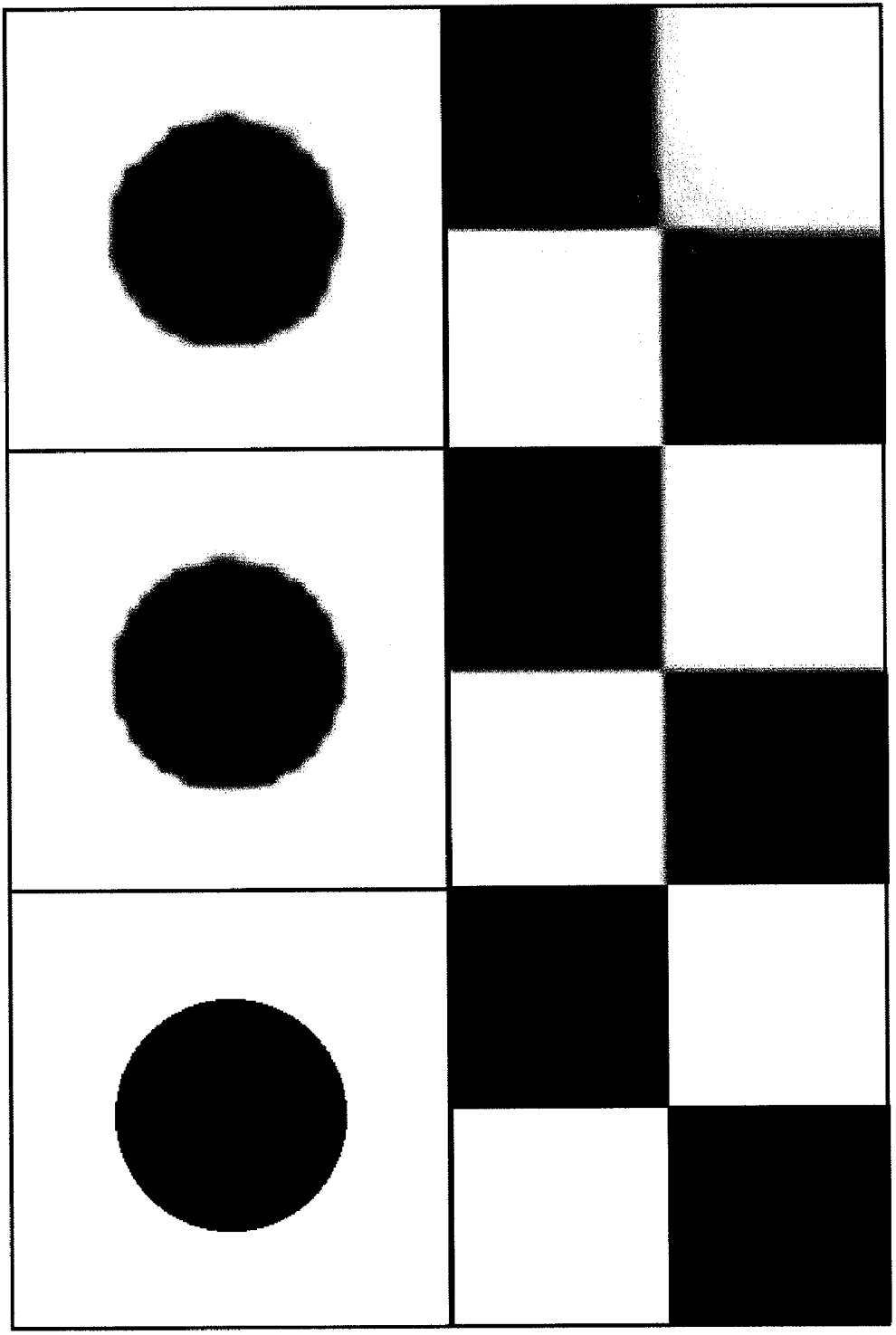
Figure 10:
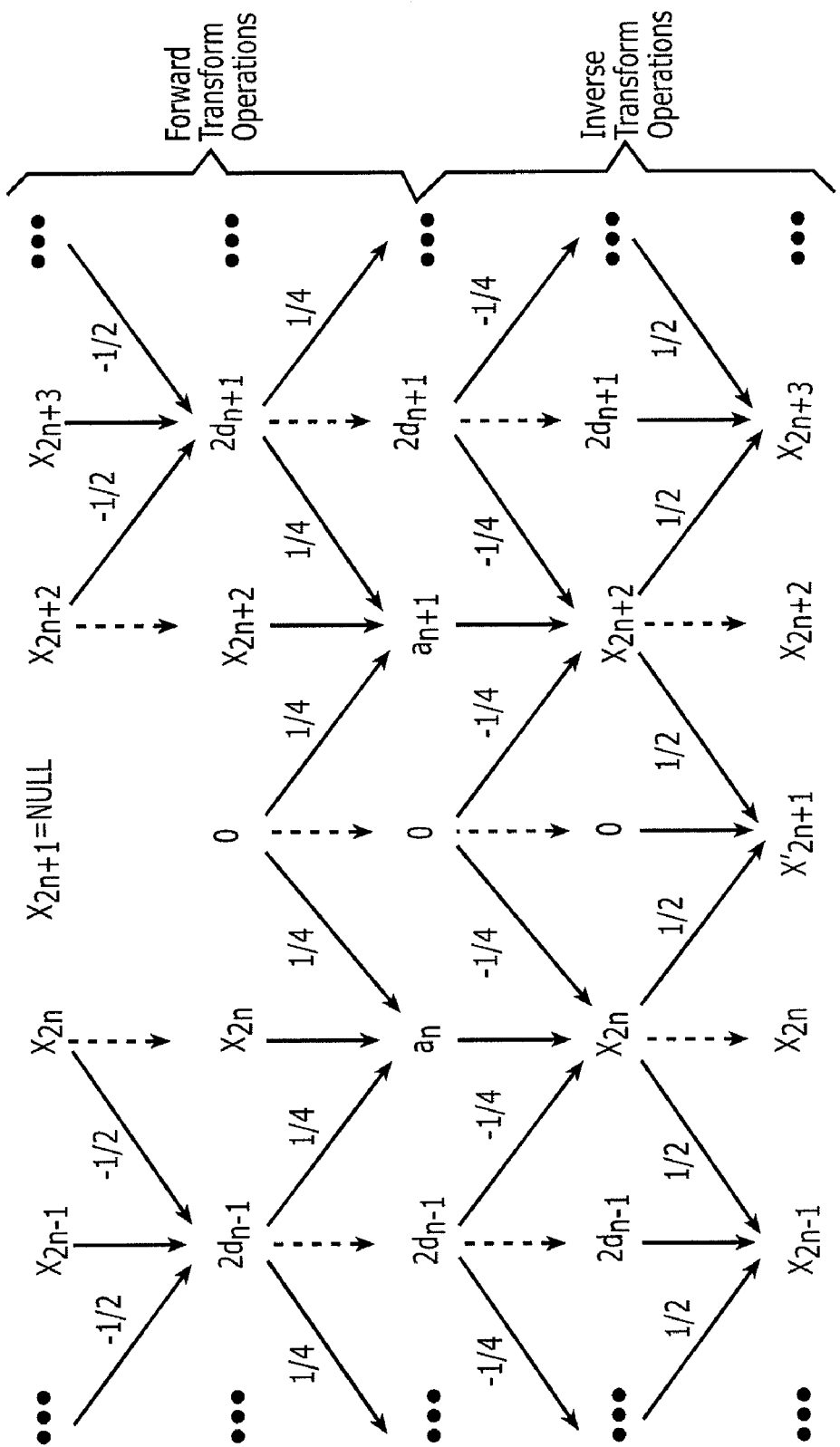
Figure 11:
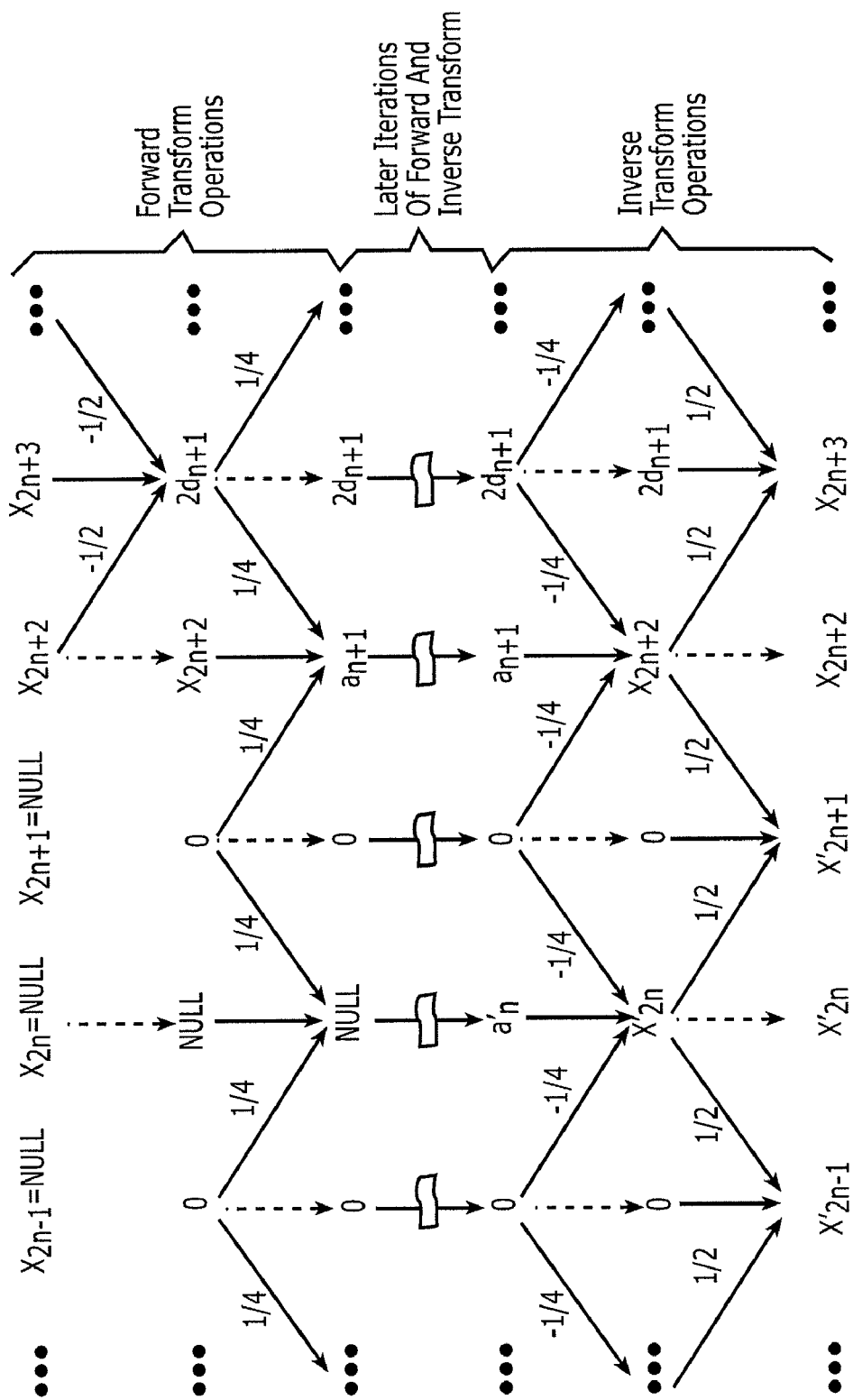
Figure 12:
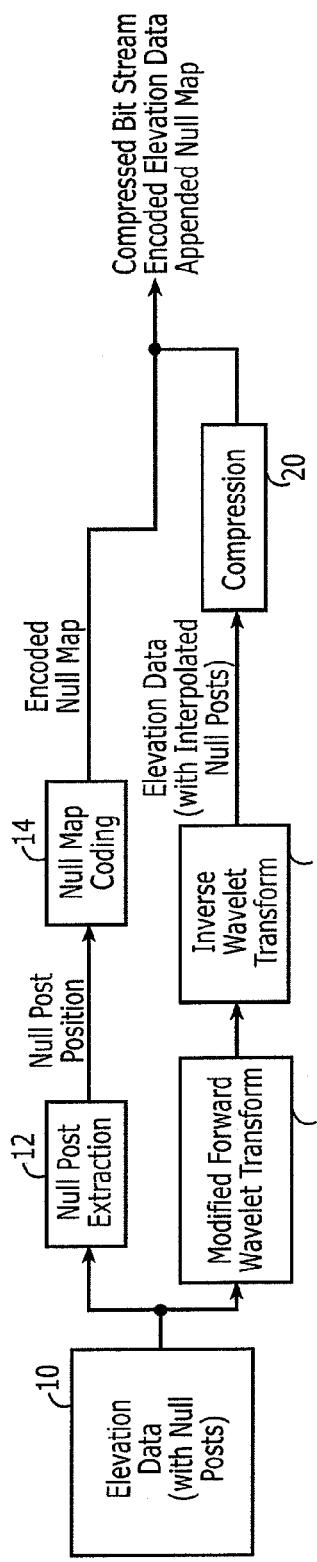
Figure 13:
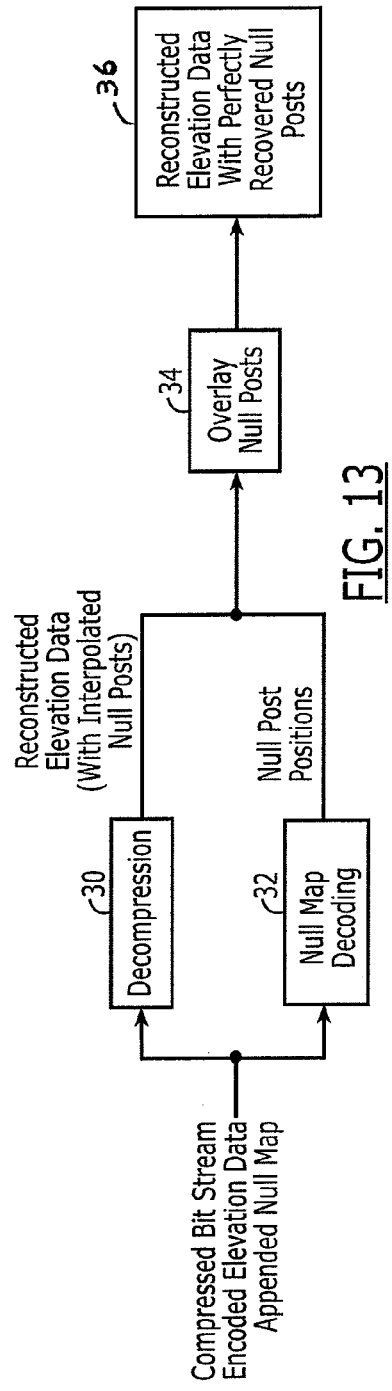
Figure 14:
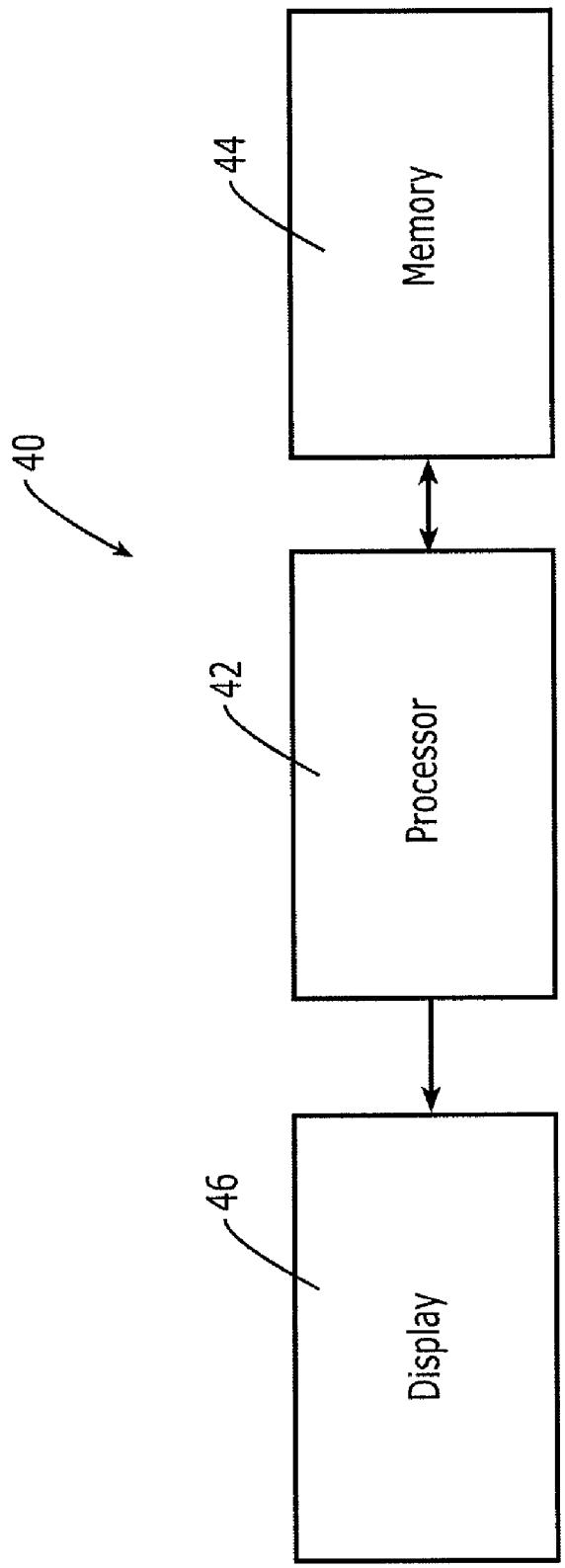

FIG. 9 provides examples of distortion effects under lossy wavelet-based compression;

FIG. 10 is a diagrammatic representation of the processing of an odd-indexed null sample in accordance with one embodiment of the present invention;

FIG. 11 is a diagrammatic representation of the processing of an even-indexed null sample surrounded by null samples sample in accordance with one embodiment of the present invention;

FIG. 12 is a block diagram illustrating the operations performed to compress image data by a method and a computer program product in accordance with one embodiment of the present invention;

FIG. 13 is a block diagram illustrating the operations performed to decompress image data by a method and a computer program product in accordance with one embodiment of the present invention; and FIG. 14 is a block diagram of an apparatus for compressing and/or decompressing image data in accordance with one embodiment of the present invention.

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
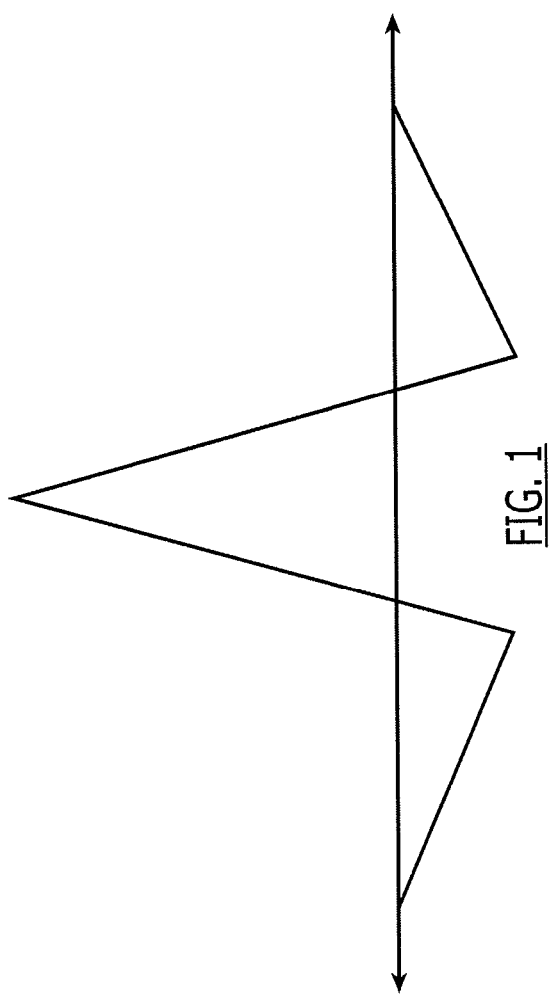
FIG. 1 is a representation of a wavelet basis function.

The method, apparatus and computer program product of embodiments of the present invention may reduce distortion while maintaining or improving the compression performance in conjunction with the compression and decompression of an image that includes a null post, a textual or graphical overlay or other feature distinct from the underlying image, i.e., an element that is not a portion of the underlying image, in accordance with a lossy wavelet-based compression technique. Wavelet-based compression relies upon a wavelet transform to decompose an image, hereinafter also referred to as a signal, in terms of basis functions which are dilations and translations of a single prototype function. This prototype function is a bandpass or highpass filter, named a "wavelet" because it is both oscillatory and spatially localized. A simple 1-D wavelet, one member of a "family" of wavelets useful for compression applications, is shown in FIG. 1. The translations and dilations of the prototype wavelet yield a basis which can produce a signal or image decomposition localized in position and resolution, respectively.

Figure 2:
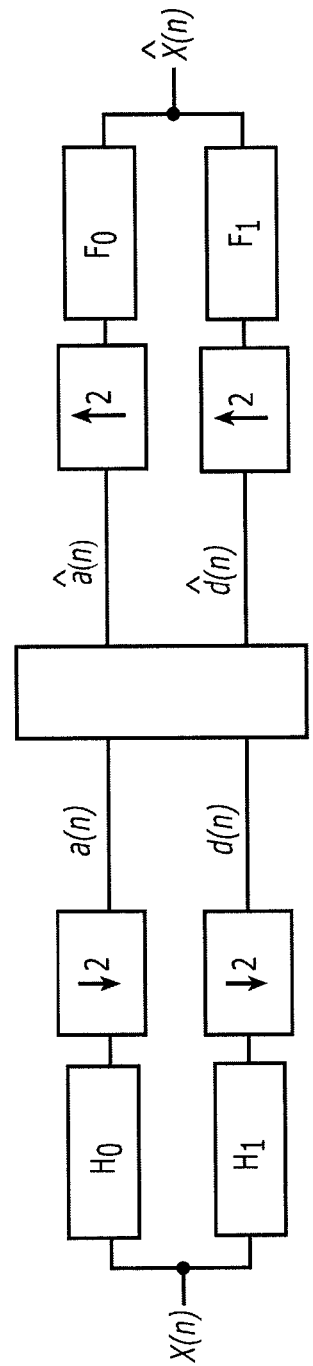
FIG. 2 is a block diagram of a single iteration of a Fast Wavelet Transform (FWT) and a Fast Inverse Wavelet Transform.
Figure 3:
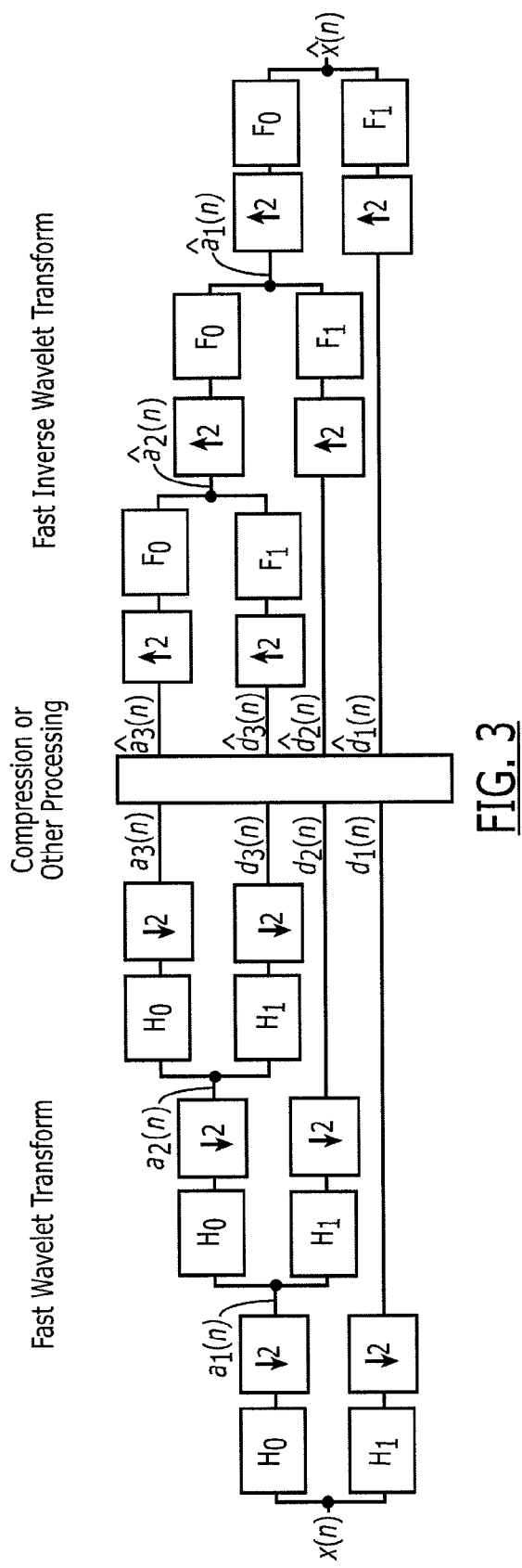
FIG. 3 is a block diagram of three iterations of a FWT and a Fast Inverse Wavelet Transform.

The wavelet transform can be efficiently computed using a fast discrete algorithm which recursively applies the wavelet filter and a companion lowpass filter called a "scaling" filter. The wavelet filter and scaling filter together form a quadrature mirror filter pair, so-called because they split the spectrum of a discrete-time signal into mirror halves. For a single iteration of the Fast Wavelet Transform (FWT) algorithm, the wavelet and scaling filters are convolved against the signal, followed by decimation (downsampling) by a factor of two. This process is illustrated in FIG. 2, where $H_0$ and $H_1$ represent the scaling analysis filter and the wavelet analysis filter, respectively. $F_0$ and $F_1$ represent the scaling synthesis filter and the wavelet synthesis filter, respectively. Decimation by two, i.e., dropping every other sample, is represented by $\downarrow 2$. These analysis filters split the signal into a low resolution approximation signal (extracted by the scaling filter and denoted by a(n)) and a high resolution detail signal (extracted by the wavelet filter and denoted by d(n)). Due to the decimation step, the approximation and detail signals each have half as many samples as the original signal, x(n), but together they contain all of the information of the original signal. The complete FWT algorithm operates by recursively iterating this filtering step on the approximation signal, yielding a multiresolution decomposition of the signal, consisting of the detail signals at various resolutions and a final low resolution approximation signal. FIG. 3 depicts three iterations of the FWT, showing both the forward and inverse transforms. The cascade of recursive filter and decimation operations results in basis functions for the detail signals at the various resolution levels which are simply dilated versions of the prototype wavelet function. This scaling property of the wavelet basis functions is a result of constraints applied to the design of the wavelet and scaling filters.

The multiresolution wavelet representation of the original signal has many useful properties. For typical real world signals, most signal energy will be concentrated into a small subset of the coefficients, concentrated toward the lower resolution levels and primarily associated with edges and other localized signal features. This energy compaction property makes the wavelet transform useful for many applications including compression, denoising, signal or image fusion, and feature extraction. The original signal (or a processed version thereof can be recovered by applying the fast inverse wavelet transform, which essentially reverses the steps of the forward transform.

The method, apparatus and computer program product can utilize any of a number of different wavelet filters in the wavelet-based compression process. The ideal properties of a wavelet filter include orthonormality, smoothness, vanishing moments, symmetry, spatial/time localization, compact support, and rational coefficient values. In this regard, orthonormal transforms preserve the $L^2$ norm in the transform domain which preserves energy measures and RMS error measures, thus simplifying quantization strategies. Smooth synthesis filters reduce artifacts due to quantization and approximation which improves the visual appearance of reconstructed signals and images. As to vanishing moments, a wavelet filter with N vanishing moments has a convolution product of zero with polynomials up to order N−1 which causes the transform coefficients to be small or zero wherever the signal can be well approximated by a piecewise polynomial. Symmetric filters have a linear phase response which results in several desirable properties including constant delay due to filter computations, accurate estimation of time or position of signal or image features, and no phase distortion due to approximation of transform coefficients. Also, symmetric filters allow simple handling of image boundaries, through symmetric extension of the image content. As to spatial/time localization, the localization of the wavelet filters in the spatial/time domain allows localized signal or image content to be represented efficiently, i.e., features which are localized in space or time can be explicitly captured with a few transform coefficients, which improves the performance for compression and analysis applications. Additionally, localization of the wavelet filters in the frequency domain allows band-limited signal and image content to be represented efficiently. A compactly supported filter has a finite number of filter coefficients which reduces computational complexity and improves the spatial/time localization characteristics of the filter. Finally, some wavelet filters can be implemented with filter coefficients which are multiples of powers of ½ which allow computationally efficient implementations which replace multiplications with simple shifts and adds.

Unfortunately, no single wavelet filter combines all of the desired properties. For example, the Heisenberg uncertainty principle places a lower bound on the joint time and frequency localization that can be achieved by any filter. Thus, improving the resolution in time results in degraded resolution in frequency, and vice versa. Also, certain combinations of desired properties are mutually exclusive. For example, any wavelet filters which are orthogonal and compactly-supported (except for the trivial 2-tap Haar filter) must have irrational coefficient values and will not be symmetric or antisymmetric, and thus cannot have a linear phase response.

As such, the choice of a wavelet filter requires tradeoffs between these properties. For example, biorthogonal wavelet filters are usually chosen for image compression applications. By giving up orthogonality, biorthogonal filters achieve many desirable properties: compact support, symmetry, and rational coefficients (multiples of powers of ½). Also, with biorthogonal filters, the properties can be split between the forward and inverse transforms in a preferred manner. For example, the number of vanishing moments for the analysis filters can be maximized in order to efficiently approximate piecewise polynomials, while emphasizing smoothness for the synthesis filters in order to minimize objectionable quantization artifacts. Although biorthogonal wavelet filters are not orthogonal, they are almost orthogonal, due to their localization in the time and frequency domains. Thus, the $L^2$ norm is almost preserved in the transform domain, so that RMS and energy measures computed in the transform domain are sufficiently accurate for most purposes.

One advantageous wavelet filter employed by JPEG 2000 (Part 1—Core Coding) and other compression algorithms, such as the EagleEye™ compression algorithm employed by The Boeing Company, use a 5-3 biorthogonal wavelet filter because it combines good coding efficiency and efficient computation. The denotation 5-3 indicates that the basis filters have five and three filter taps (coefficients) respectively. The 5-3 filter pair has two vanishing moments on the analysis filters, which allows them to effectively decorrelate regions which can be approximated by first-order polynomials (constant or linearly varying). In contrast, longer filters with additional vanishing moments can decorrelate higher-order polynomial regions, but are less spatially localized (encoding edges and small features less efficiently) and require a significant increase in computation. The filter coefficients ($L_1$ normalized) for the 5-3 biorthogonal filters are:

$$\text{Forward scaling filter: } H_0 = \left\{-\frac{1}{8} \quad +\frac{2}{8} \quad +\frac{6}{8} \quad +\frac{2}{8} \quad -\frac{1}{8}\right\}$$

$$\text{Forward wavelet filter: } H_1 = \left\{-\frac{1}{4} \quad +\frac{2}{4} \quad -\frac{1}{4}\right\}$$

$$\text{Inverse scaling filter: } F_0 = \left\{+\frac{1}{4} \quad +\frac{2}{4} \quad +\frac{1}{4}\right\}$$

$$\text{Inverse wavelet filter: } F_1 = \left\{-\frac{1}{8} \quad -\frac{2}{8} \quad +\frac{6}{8} \quad -\frac{2}{8} \quad -\frac{1}{8}\right\}$$

The FWT algorithm can be easily extended to two-dimensional imagery by separately filtering the rows and columns, and iterating on the lowpass approximation image. This process is equivalent to decomposing the image in terms of basis functions which are 2-D tensor products of the 1-D wavelet and scaling filters. The FWT algorithm is efficient computationally, with complexity of only O(n) (as compared to O(n·log n) complexity for Fast Fourier Transforms and DCTs). It is well-suited for real-time computing implementations, including massively parallel computer architectures.

Figure 4:
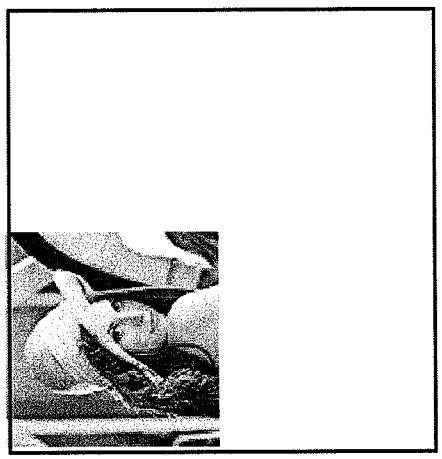
FIG. 4 is a representation of the application of the FWT to an image.
Figure 4:
Figure 4:
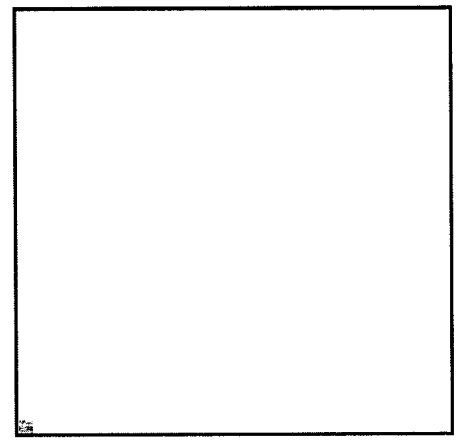

FIG. 4 depicts the application of the wavelet transform to a test image. The first iteration of the transform splits the image into three detail subimages (highpass/highpass (HH) at lower right, highpass/lowpass (HL) at upper right, lowpass/highpass (LH) at lower left) and one approximation subimage (lowpass/lowpass (LL) at upper left).

The algorithm is then recursively iterated on the approximation subimage at upper left, yielding a final result divided into subimages corresponding to various resolutions, with the finer resolutions toward the bottom and right, the coarser resolutions toward the top and left, and the final low resolution approximation image at the upper left corner. In this figure, the magnitudes of the coefficients in the detail subbands are represented by the intensity of the associated dots, with white representing zero magnitude and shades of gray which are darkened with increasing magnitudes. As will be noted, sequences of dots in the detail subbands are indicative of larger coefficients along the edges of the image.

The orthogonality/biorthogonality properties of wavelet filters result in filter structures which can be factored into pre-filters, resulting in simplified convolution computations. Factorization of the wavelet filters offers the following benefits: (i) interim computational results are shared over several convolution operations, thus substantially reducing redundant computations, (ii) Convolutions are computed using simple operations such as adds/subtracts and shifts, (iii) perfect reconstruction (invertible) wavelet transforms may be computed using fixed point arithmetic with very low precision (only a few bits more than the sample depth), and (iv) the transform can be computed in-place by interleaving the approximation and detail coefficients produced by the transform.

The time domain construction of wavelet filters overcomes many constraints of traditional constructions which are performed in the Fourier domain. As such, it is possible to construct many novel bases, including non-linear wavelets, irregularly sampled wavelets, multi-wavelets (i.e., wavelets with multiple sets of filters), and wavelets on manifolds such as spherical surfaces.

By way of example, in conjunction with the factorization of the 5-3 biorthogonal filters, the approximation coefficients a( ) of the forward transform (normalized by the $L^1$ norm and computed in a single dimension) are given by convolution of the samples x( ) using the scaling filter, followed by subsampling:

$$a(n) = -\frac{1}{8}x(2n-2) + \frac{2}{8}x(2n-1) + \frac{6}{8}x(2n) + \frac{2}{8}x(2n+1) - \frac{1}{8}x(2n+2)$$

The detail coefficients d( ) of the forward transform ($L^1$ normalized and computed in a single dimension) are given by convolution of the samples x( ) using the wavelet filter, followed by subsampling:

$$d(n) = -\frac{1}{4}x(2n) + \frac{2}{4}x(2n+1) - \frac{1}{4}x(2n+2)$$

The scaling filter can be factored in terms of the wavelet filter, giving the following simplified expression for computation of the approximation coefficients:

$$a(n) = \frac{1}{2}d(n-1) + x(2n) + \frac{1}{2}d(n)$$

The equations for the inverse transform are then obtained by simply reversing the steps of the forward transform:

$$\hat{x}(2n) = -\frac{1}{2}d(n-1) + a(n) - \frac{1}{2}d(n)$$

$$\hat{x}(2n+1) = \frac{1}{2}\hat{x}(2n) + 2d(n) + \frac{1}{2}\hat{x}(2n+2)$$

It is also possible to implement a "reversible" wavelet transform providing perfect reconstruction while using finite precision arithmetic. This is possible because the roundoff errors on the forward transform can be cancelled by the roundoff errors on the inverse transform. With this approach, the detail coefficients can be computed as:

$$2d(n) = x(2n+1) - \left\lfloor \frac{x(2n) + x(2n+2) + 1}{2} \right\rfloor$$

where $\lfloor \rfloor$ represents the "floor" operation, which truncates the fractional portion of the quotient. The division by two indicated in this expression is a simple right shift operation, with the least significant bit shifted out. The "1" added prior to the division (right shift) operation is optional and changes the truncation to a rounding operation. As shown below, the roundoff errors which result from this division operation will be cancelled as part of the inverse transform. It is noted that the detail coefficient, 2d(n), obtained as a result of this convolution operation, is normalized at twice the nominal $L^1$ normalization. This normalization requires a single bit of additional precision beyond the original precision of the samples x( ). The additional precision is retained to eliminate the need for a division or right shift operation on the odd-indexed sample x(2n+1), which would introduce a loss of precision which could not be recovered. This increased precision does not accumulate over resolution levels, since this added precision is used only on the computation of the detail coefficients while the wavelet transform is iterated only on the approximation coefficients. The approximation coefficients may now be computed as:

$$a(n) = x(2n) + \left\lfloor \frac{2d(n-1) + 2d(n) + 2}{4} \right\rfloor$$

The division by four indicated in this expression is a simple right shift operation, with the two least significant bits shifted out. The "2" added prior to the right shift operation is optional and changes the truncation to a rounding operation. The inverse transform is again obtained by simply reversing the steps of the forward transform:

$$x(2n) = a(n) - \left\lfloor \frac{2d(n-1) + 2d(n) + 2}{4} \right\rfloor$$

$$x(2n+1) = 2d(n) + \left\lfloor \frac{x(2n) + x(2n+2) + 1}{2} \right\rfloor$$

Figure 5:
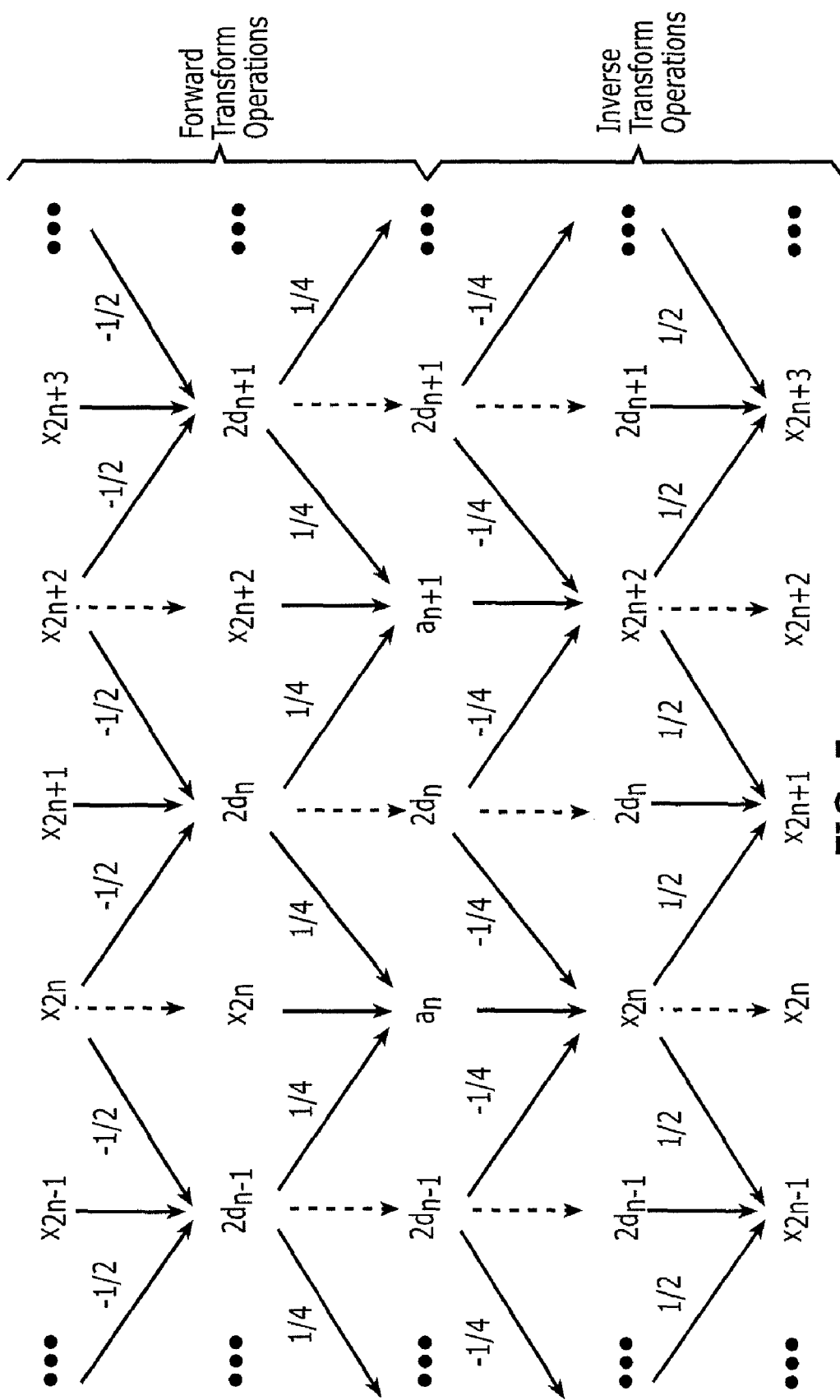
FIG. 5 is a diagrammatic view of the lifting steps for Forward and Inverse Wavelet Transforms using 5-3 Biorthogonal Filters at a single resolution level.

The division operations in these equations are identical to those in the forward transform and result in identical roundoff errors, but with opposite sign, thus cancelling the roundoff errors from the forward transform. The ^ notation has been eliminated in the foregoing equations to indicate that the samples are perfectly reconstructed. The convolution operations of the lifting scheme for the 5-3 biorthogonal wavelet basis are depicted in FIG. 5. This diagram depicts the convolution operations at a single resolution level. In a multiresolution transform, these convolution operations would be recursively applied to the approximation coefficients.

A discrete transform of a finite length signal is traditionally computed using a periodic extension of the signal, which is equivalent to wrapping the signal on itself. An undesirable side effect of this approach is that it generally introduces a discontinuity at the boundary of the signal, producing boundary artifacts in compressed imagery or signals.

With symmetric basis functions, such as biorthogonal wavelet filters, a symmetric extension of the signal can be employed by reflecting the signal at the boundary. When the point of symmetry on the signal extension matches the point of symmetry on the symmetric (or antisymmetric) filter, the filtering will produce a result which is also symmetric (or antisymmetric). With symmetry, the reflected coefficients are redundant. Thus, with a finite signal of length N, the filtered result of the signal and its reflection has only N unique coefficients. The advantage of symmetric extension over periodic extension is that the reflection at the boundary introduces no discontinuity in the signal, although the symmetric extension may introduce a change in slope. By avoiding discontinuities, boundary artifacts under operations like quantization and lossy compression are reduced.

Figure 6:
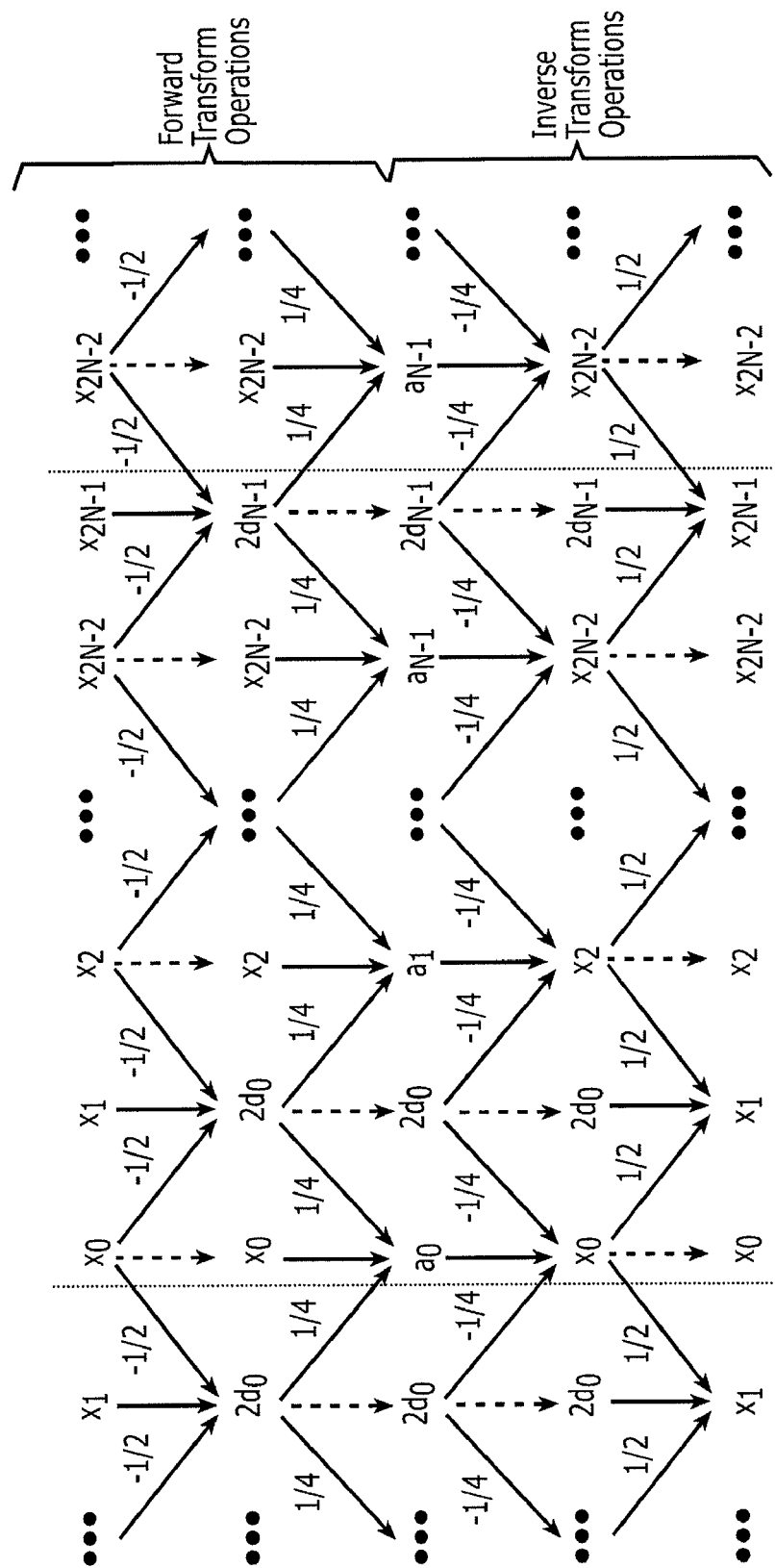
FIG. 6 is a diagrammatic representation of the symmetric extension of an even length signal with 5-3 biorthogonal filters.

FIG. 6 shows an example of the application of the 5-3 biorthogonal wavelet filters to a symmetrically extended signal of even length 2N. Due to symmetry, the coefficients computed at the boundaries receive multiple contributions from certain terms in the convolution. For example, approximation coefficient a(0) receives the contribution from the 2d(0) term twice, once from the actual 2d(0) term and once from the reflected 2d(0) term. This has the effect of changing the weight of the 2d(0) term from $-\frac{1}{4}$ to $-\frac{1}{2}$. Thus, a result equivalent to symmetric extension can be obtained by modifying the filters at the boundaries to take into account the contributions from reflected terms.

Figure 7:
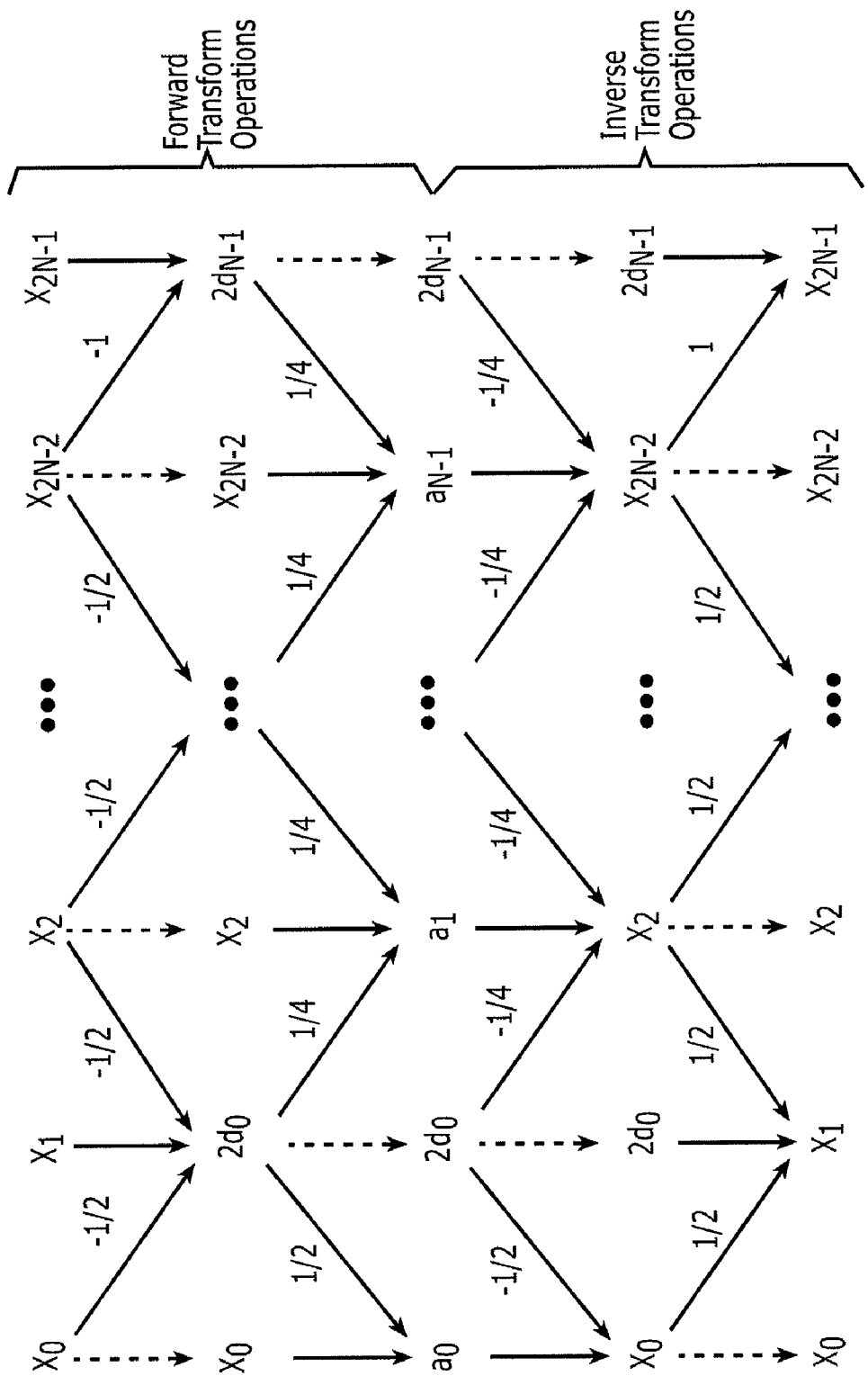
FIG. 7 is a diagrammatic representation of a wavelet transform of an even length signal using symmetrically extended 5-3 biorthogonal filters.

FIG. 7 depicts the modification of the filters of the 5-3 biorthogonal basis to account for the symmetric extension of an even length signal. The filter branches which have been modified are those extending from $x_{2N-2}$ to $2d_{N-1}$, from $2d_0$ to $a_0$, from $2d_0$ to $x_0$ and from $x_{2N-2}$ to $x_{2N-1}$. When symmetric extension is applied to an odd length signal of length 2N+1, the point of symmetry at the right boundary changes from an odd-indexed term to an even-indexed term, which changes the boundary filters on that side.

Figure 8:
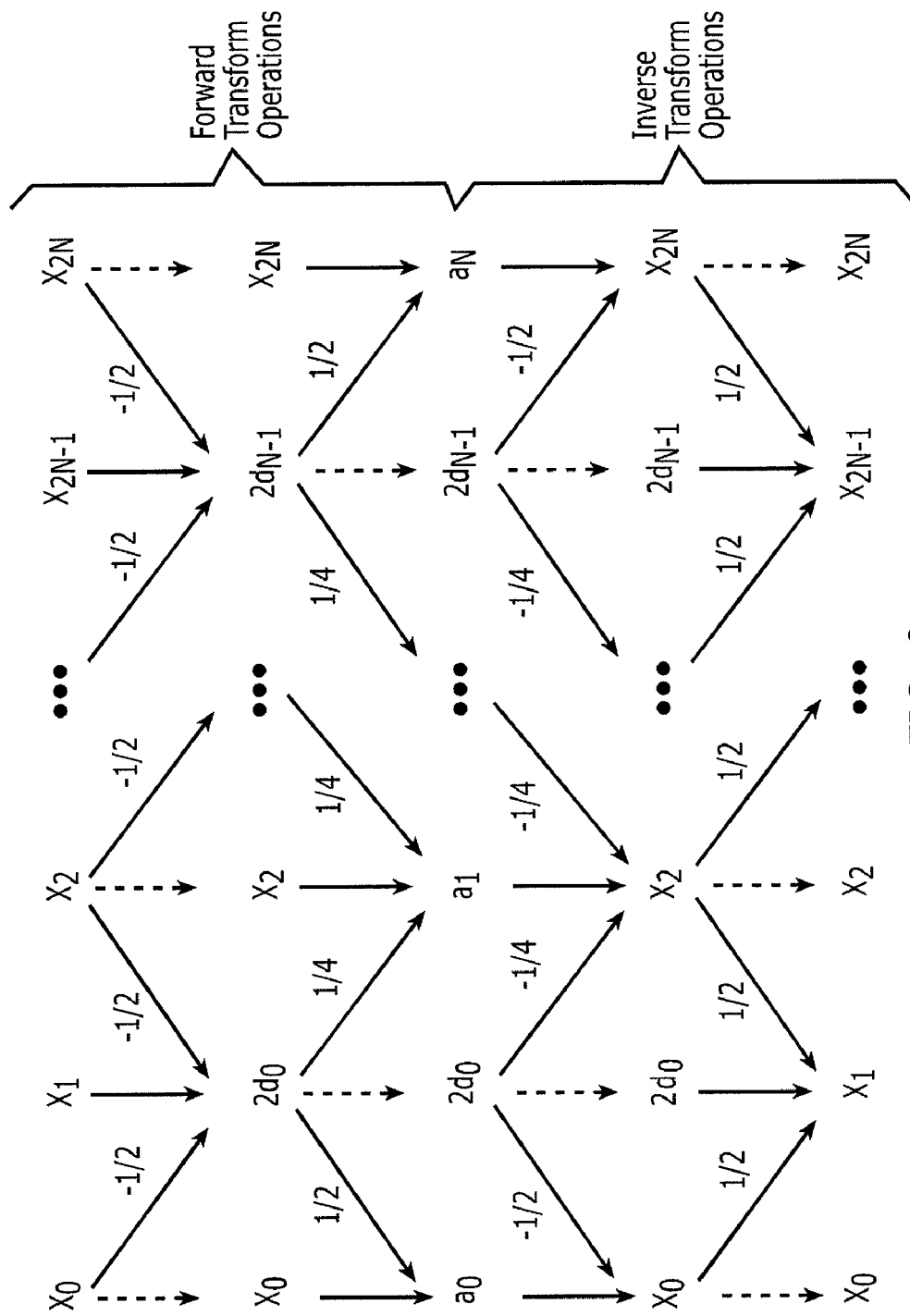
FIG. 8 is a diagrammatic representation of a wavelet transform of an odd length signal using symmetrically extended 5-3 biorthogonal filters.

FIG. 8 depicts the modification of the filters of the 5-3 biorthogonal basis to account for the symmetric extension of an odd length signal. The filter branches which have been modified are those extending from $2d_{N-1}$ to $a_N$, from $2d_0$ to $a_0$, from $2d_0$ to $x_0$ and from $2d_{N-1}$ to $x_{2N}$.

In one embodiment, the method, apparatus and computer program product replaces the data values representative of null posts, overlays or other features distinct from the underlying image in such a manner that the null posts, overlays or other features distinct from the underlying image will produce no effect or minimal effect on the adjacent regions within the resulting image, following decompression, while also making the image relatively easy to compress.

As noted previously, the increased distortion effects associated with null posts, overlays or other features distinct from the underlying image can be traced to the effects of the quantization of the wavelet coefficients associated with these features. Thus, the method, apparatus and computer program product of embodiments of the present invention eliminates or mitigates these distortion effects by focusing upon the wavelet transform domain, so that the effects of quantization on these coefficients can be directly addressed.

The distortion effects that occur under lossy wavelet compression are due to the manner in which sharp transitions such as edges and point features are represented by wavelet basis functions. Just as an edge spreads across frequency in the Fourier transform domain, introducing energy into the coefficients at all frequencies, so an edge spreads across all resolution levels in the wavelet transform domain. The primary difference is that wavelet coefficients are spatially localized, so that an edge will affect only those coefficients whose basis functions overlap the location of the edge. Under lossy compression, the coefficients of the wavelet transform are quantized. Due to the considerations which minimize distortion (as measured by RMS error), the quantization has a more severe effect at finer scales than at coarser scales. Thus, under lossy compression, the strong quantization effects on fine scale coefficients soften or blur an edge, and can also produce other effects such as ringing and aliasing. These effects become more pronounced as the compression ratio and quantization interval increases.

Examples of these effects are depicted in FIG. 9, where a lossy wavelet-based compression technique is applied to two simple test images with high contrast squares or a high contrast circle. The compression ratios used in these examples are relatively high because the images are simple and can be coded very efficiently. For the moderate compression ratios (334:1 on the squares and 240:1 on the circle), blurring is apparent. In the case of the circle, an aliasing effect is also apparent, which occurs due to the representation of the curving edge of the circle with primarily coarse resolution wavelets. At the high compression ratios (771:1 on the squares and 528:1 on the circles), the blurring is even more severe, and ringing effects are also present. The ringing is due to the elimination of fine scale wavelets at the "sidelobes" of the edge. These fine scale wavelets ordinarily cancel out the sidelobes of the coarse scale wavelets at the edge. As the fine scale wavelets are removed by quantization, this cancellation no longer occurs, leaving the ringing effect. This ringing can extend very far from the edge due to the large spatial extent of wavelet basis functions at the coarse resolution levels.

The magnitude of blurring, aliasing, ringing, and other quantization-induced distortion effects is directly related to the magnitude or contrast of the edge or transition in the image. Representation of high contrast edges requires wavelet coefficients with large magnitudes, and when quantization is applied to these coefficients, the resulting artifacts can be pronounced. Thus, the distortion effects due to quantization of wavelet coefficients in null post regions can be mitigated by reducing the magnitude of those wavelet coefficients. If the magnitude of any coefficients can be reduced to zero, then the distortion due to quantization of those coefficients is eliminated, since zero-valued coefficients are unchanged by quantization, when using dead zone quantizers employed by JPEG 2000 and other lossy wavelet-based compression techniques. Reducing the magnitude of the wavelet coefficients will also make the image easier to compress. The distribution of wavelet coefficients can be approximated by a Laplacian distribution centered at zero. Thus, reducing the coefficient magnitudes will reduce the coefficient entropy and improve coding efficiency.

Because the distortion effects occasioned by null posts, overlays or other features distinct from the underlying image originate from the quantization of wavelet coefficients, the method, apparatus and computer program product of embodiments of the present invention will modify the wavelet coefficients associated with the null posts, overlays or other features distinct from the underlying image during the process of computing the forward wavelet transform, and will then generate the modified image by applying the inverse wavelet transform to the resulting transform domain representation (which includes the modified coefficients). More specifically, the method, apparatus and computer program product of embodiments of the present invention will determine the forward wavelet transform, while modifying the wavelet coefficients associated with the null posts, overlays or other features distinct from the underlying image at each resolution iteration of the transform. In one advantageous embodiment, the modifications to the wavelet coefficients will be made provided that in the resulting image (produced by the inverse wavelet transform), the data values for the remainder of the image, that is, those portions of the image other than the null posts, overlays or other features distinct from the underlying image, are preserved, i.e., are unchanged as a result of the modifications to the wavelet coefficients from the original image. Subject to the foregoing constraint relating to the preservation of the underlying image, if a wavelet coefficient is to be modified, the method, apparatus and computer program product of one embodiment will endeavor to set the wavelet coefficients to zero, if possible, or to as small of a value as possible, if zero is not possible. In particular, the method, apparatus and computer program product of one embodiment will modify the wavelet coefficients so as to reduce, such as by minimizing, the mean squared value for the wavelet coefficients.

For an image with N pixels (also referred to herein as samples or data values having respective locations), the inverse wavelet transform may be represented as an N×N matrix which operates on N wavelet coefficients to obtain a reconstruction of the N pixel image. The method, apparatus and computer program product can compress and decompress a variety of images, such as graphical images and photographic images, such as those displayed upon computer monitors or other displays. Additionally, the image may be comprised of elevation data, such as digital terrain elevation data, which associates an elevation with a respective geographical region. As noted above, the image may include an overlay or other feature that is distinct from the underlying image and therefore has a value that differs substantially from the values of the surrounding pixels. In the embodiment in which the image comprises elevation data, the image may include one or more null posts. Null posts are located in those regions for which accurate elevation data is unavailable. Null posts typically have a preassigned value, such as −32,768, which uniquely identifies the value to be associated with a null post since the value otherwise never occurs within the image. For purposes of example, one embodiment of the method, apparatus and computer program product will now be described in conjunction with an image comprised of elevation data that includes a plurality of null posts. However, it should be understood that other embodiments of the method, apparatus and computer program product can process other images, such as graphical images, that include overlays or other features that are distinct from the underlying image.

By way of example, in instances in which the image having N pixels has M null posts, the determination of the appropriate modification of the wavelet coefficients may be viewed as a set of N simultaneous equations (defined by the inverse wavelet transform matrix), with M unknowns which are the wavelet coefficients associated with the null posts. From this perspective, the method, apparatus and computer program product of one embodiment solves for these unknowns so as to minimize an objective function, e.g., the mean squared value of the wavelet coefficients, subject to the constraint of preserving the data values at the non-null locations of the image. This system of equations could be solved using a variety of techniques including numerical linear algebra methods or iterative techniques. However, three factors conveniently allow this simultaneous system of transform equations to be separated into smaller sets of equations or even individual equations, which may be solved directly. These factors are: (i) the multiresolution structure of the wavelet transform allows the complete set of simultaneous transform equations to be separated into sets of simultaneous equations at each resolution level, (ii) a wavelet transform is a separable transform, producing a two-dimensional transform by separate filtering of rows and columns, so as to permit further separation of the wavelet equations at a given resolution and to allow consideration of the coefficient modification in the context of a single dimension at a time, and (iii) the factorization of the wavelet filter equations, combined with the insertion of zeros in place of null-associated detail coefficients will allow the equations at a single resolution and a single dimension to be separated into smaller sets of equations, which will lead to direct solution of substitution values for all null-associated wavelet coefficients.

Each pixel or other data value of an image is generally assigned an index n with n generally being a non-negative integer, i.e., 0, 1, 2, 3, . . . . As shown below, the determination of wavelet coefficients which are associated with odd-indexed null samples is straightforward. Furthermore, the techniques described below in conjunction with modification of the wavelet coefficients will allow the detail coefficients associated with odd-indexed null posts to be modified at the current resolution level, while in many cases letting the even-indexed null posts propagate directly to the approximation coefficients (retaining the null post value), where they will be processed at one of the later (coarser) resolution levels of the wavelet transform. As such, the analysis of the processing of null posts within the wavelet transform can be restricted to a single dimension and a single resolution level.

The method, apparatus and computer program product of embodiments of the present invention modify at least some and, more typically, all coefficients associated with null regions, with the modifications generally taking the form of extrapolation/interpolation from nearby coefficients. In practice, when a null region is very large, the quantization of the coefficients associated with some null posts in the interior of the region will have no effect on the values of any valid samples, i.e., non-null post pixels of the image, and therefore need not be modified. However, the modification of even these coefficients may be beneficial in terms of reducing the coefficient entropy and thereby improving coding efficiency. Thus, the method, apparatus and computer program product of one embodiment will determine modifications for all coefficients associated with null posts.

Although the method, apparatus and computer program product can employ various lossy wavelet-based compression techniques with different wavelet transforms, the method, apparatus and computer program product of one embodiment will be described hereinafter in conjunction with a 5-3 wavelet transform for purposes of example, but not of limitation. In this regard, a 5-3 wavelet transform centers detail coefficients on odd-indexed samples and approximation coefficients on even-indexed samples. The manner in which the method, apparatus and computer program product process various distributions of null-valued samples will now be described.

An odd-indexed null sample, such as a null post located at the first, third, fifth, etc. position within an image, can be represented as follows:

$$x(2n-1) = \text{NULL}$$

If possible, it would be advantageous to modify this sample value so that the associated detail coefficient d(n) will be equal to zero if the values of the adjacent samples can be preserved. This result may be achieved by simply substituting the interpolated value:

$$\hat{x}(2n+1) = \left\lfloor \frac{x(2n) + x(2n+2) + 1}{2} \right\rfloor$$

In one embodiment, however, this value need not be computed because its only use in the forward transform is for the computation of the associated detail coefficient. Thus, the value for this associated detail coefficient may, instead, be changed directly to zero:

$$\hat{d}(n) = 0$$

The appropriate interpolated value for the odd-indexed null sample will then be computed as part of the inverse wavelet transform. This situation is depicted in FIG. 10.

It is also noted that the detail coefficient associated with an odd-indexed null sample may be set equal to zero even in instances in which the odd-indexed null sample occurs at the end a line. For this situation, the filter equations are handled by symmetric extension as discussed above. Even in this situation, the symmetric extension makes no difference and the associated detail coefficient may be set equal to zero. This change will result in the appropriate value for the odd-indexed null sample (which in this case is equal to the value of the preceding sample) being generated by the inverse transform.

As such, it is noted that a detail coefficient associated with a odd-indexed null sample may be set to zero without regard to the values of the adjacent samples, and even more specifically, without consideration of whether the adjacent samples have null values. Since the substitution value for the odd-indexed null sample will not be generated until the inverse transform is computed, this will automatically take into account any changes made to adjacent null samples. Additionally, it is noted that the insertion of a zero-valued detail coefficient breaks the chain of the factored wavelet computations. Without this effect, the operation of the wavelet filters at a given resolution level define a system of simultaneous equations. The insertion of zero-valued detail coefficients facilitates the separation of these equations into smaller systems of equations which may be solved directly. Additionally and advantageously, in embodiments of the present invention which employ a lossy wavelet-based compression algorithm having a deadzone quantizer for which the quantized value for zero is zero regardless of the quantization interval, a zero-valued coefficient will be unaffected by quantization. Further, zero-valued coefficients minimize the energy of the image and are encoded more efficiently than other values, thus improving the compression performance.

In contrast to odd-indexed null samples for which the corresponding detail coefficients may simply be set to zero, the approximation coefficients associated with even-indexed null samples, such as a null post located at the second, fourth, sixth, etc. position within an image, are also modified, but the type of modification depends upon the values of the adjacent samples. For example, one situation arises when three consecutive samples centered on an even index location are all null as set forth below:

$$x(2n-1) = x(2n) = x(2n+1) = \text{NULL}$$

As noted above, the detail coefficients associated with the odd-indexed samples may be directly set to zero:

$$\hat{d}(n-1) = 0 \text{ and } \hat{d}(n) = 0$$

The approximation coefficient for the even-indexed null sample will now be computed (in accordance with the normal working of the forward wavelet transform) as:

$$a(n) = x(2n) + \left\lfloor \frac{2\hat{d}(n-1) + 2\hat{d}(n) + 2}{4} \right\rfloor$$

$$= \text{NULL} + \left\lfloor \frac{2 \cdot 0 + 2 \cdot 0 + 2}{4} \right\rfloor$$

$$= \text{NULL}$$

Thus, an even-indexed null sample surrounded on both sides by null samples will produce a corresponding approximation coefficient which is also null-valued. This null-valued approximation coefficient will then propagate directly to the next resolution level (or to the orthogonal dimension of the current resolution level). Ultimately, this null sample will then be processed at a later stage of the forward wavelet transform. This situation is depicted in FIG. 11.

This approach extends to the situation where an even-indexed null starts or ends a line, and is adjacent to an odd-indexed null sample. In this situation, even with the use of symmetric extension as described above, the null-valued approximation coefficient will still propagate directly to the next resolution level (or to the orthogonal dimension of the current resolution level). This null sample will then be handled by a later stage of the forward wavelet transform.

A second situation arises when an even-indexed sample is adjacent to a null sample on one side and a valid sample on the other side. In this situation, the manner in which approximation coefficient associated with the even-indexed null samples will be modified will depend upon the direction of processing, that is, either processing the coefficients associated with samples having lower indices to samples having larger indices or processing the coefficients associated with samples having larger indices to samples having lower indices. Without loss of generality, one embodiment in which the wavelet transform computations and the associated processing of null samples proceeds from samples having lower indices to samples having higher indices will be described hereinafter. However, other embodiments of the method, apparatus and computer program product contemplate that the wavelet transform computations and the associated processing of null samples proceeds from samples having higher indices to samples having lower indices.

Returning to the embodiment in which processing proceeds from samples having lower indices to samples having higher indices, one situation is defined by an even-indexed null post with the preceding sample also being a null post, and the following sample being valid, that is, having a value other than that of a null post, as set forth below:

$$x(2n-1) = x(2n) = \text{NULL } x(2n+1) \neq \text{NULL}$$

As described above, the detail coefficient associated with the preceding null may be directly set to zero:

$$\hat{d}(n-1) = 0$$

Since the detail coefficient d(n) is not directly zeroed, the approximation coefficient associated with the even-indexed null sample x(2n) must be differently modified. Proper operation of the wavelet transform requires that the same value for x(2n) must be used on both the forward and inverse transforms, except possibly for changes due to quantization or other processing. Thus, in order to avoid allowing the null value to affect the detail coefficient d(n), the sample x(2n) must be modified prior to the computation of d(n). In this regard, the value for the sample x(2n) which will minimize the detail coefficient d(n) may be selected in accordance with the following equation:

$$2d(n) = x(2n+1) - \left\lfloor \frac{x(2n) + x(2n+2) + 1}{2} \right\rfloor$$

This is a fixed point approximation for the 5-3 wavelet filter, used in the so-called "lifting scheme" or "reversible" wavelet transform described above. The 5-3 wavelet filter possesses two vanishing moments, meaning that it will produce a zero result for polynomials up to order 1. Thus, it would be desirable to extrapolate a new value for x(2n) from the adjacent valid coefficients, preferably resulting in a polynomial of order 1 or lower over the three samples x(2n), x(2n+1), and x(2n+2). For the variation where the rightmost sample x(2n+2) is valid, a linear extrapolation will be performed which will produce a value of zero for the detail coefficient d(n):

$$\hat{x}(2n) = 2x(2n+1) - x(2n+2)$$

For the situation when the rightmost sample x(2n+2) is a null, it is not yet known what the replacement value for this null will be. This is the situation where the directionality of processing comes into play. There are two possible strategies, namely, (i) directly determine the replacement value for x(2n) without knowledge of the replacement value for x(2n+2), or (ii) simultaneously determine the replacement values for x(2n) and x(2n+2) (and possibly for additional samples at higher indices).

Although either strategy is acceptable, the strategy involving directly determining the replacement value for x(2n) without knowledge of the replacement value for x(2n+2) may be preferred in some situations since an embodiment premised upon the simultaneous determination of replacement values for x(2n) and x(2n+2) must be capable of handling the growth in the number of simultaneous equations that may occur when there are additional even-indexed null samples beyond x(2n+2). Additionally, if $\hat{x}(2n)$ is determined directly, the replacement value for x(2n+2) can later be determined in a manner that is consistent with the modified sample $\hat{x}(2n)$ and the valid sample x(2n+1). In fact, if sample x(2n+3) is a null, then $\hat{x}(2n)$ may be simply set equal to x(2n+2), which will produce a value of zero for detail coefficient d(n). If sample x(2n+3) is not a null, then the value for the null sample x(2n+2) may be determined by interpolation between the surrounding valid samples (in the manner described below. Interpolating x(2n+2) in this manner will not guarantee a zero value for the detail coefficient d(n), but will produce a small value for d(n) since the interpolation will take into account the values for $\hat{x}(2n)$ and x(2n+1). Finally, the direct determination of $\hat{x}(2n)$ is generally much simpler both in implementation and in computation.

For purposes of example, but not of illustration, the method, apparatus and computer program product of one embodiment in which the replacement value for x(2n) is directly determined is hereinafter described. In this regard, with a null sample preceding and a valid sample following an even-indexed null sample x(2n), the replacement value is computed as an extrapolation from either one or two valid samples:

$$\hat{x}(2n) = \begin{cases} 2x(2n+1) - x(2n+2), & x(2n+2) \neq \text{NULL} \\ x(2n+1), & x(2n+2) = \text{NULL} \end{cases}$$

In the alternate directional case in which a valid sample precedes and a null sample follows an even-indexed null sample, the samples may be represented as follows:

x(2n−1)≠NULL x(2n)=x(2n+1)=NULL

Because this case is the mirror image of the preceding directional case, the replacement value for x(2n) can be computed as:

$$\hat{x}(2n) = \begin{cases} 2x(2n-1) - x(2n-2), & x(2n-2) \neq NULL \\ x(2n-1), & x(2n-2) = NULL \end{cases}$$

However, these equations can be simplified since the processing proceeds from samples having lower indices to samples having higher indices, which means than if the sample x(2n−2) was originally a null sample, it would have been replaced by a non-null value, leaving:

$$\hat{x}(2n) = 2x(2n-1) - x(2n-2)$$

This approach also extends to the situation where the even-indexed null at location 2n is the penultimate coefficient at the end of a line (i.e., $n_{max}$=2n+1), followed by a single valid sample in the last sample of the line. In this situation, the extrapolation would only be from a single sample value, making the replacement value equal to the final sample value:

$$\hat{x}(2n) = x(2n+1) = x(n_{max})$$

A still additional situation involving an even-indexed null sample is that presented by a single even-indexed null sample, surrounded by valid samples on either side. For example, consider the case of:

x(2n)=NULL x(2n−1)≠NULL x(2n+1)≠NULL

This null sample affects two detail coefficients, d(n−1) and d(n). As such, the method, apparatus and computer program product will choose a value for x(2n) which reduces or, more preferably, minimizes the sum of the squared values for these detail coefficients. Since these coefficients are also dependent on x(2n−2) and x(2n+2), those samples must also be taken into account as well. Because the processing of one advantageous embodiment proceeds from samples having lower indices to samples having higher indices, any null value at sample location x(2n−2) would have been replaced by a non-null value. Thus, the only two variations that must be considered are where x(2n+2) is valid or a null.

To minimize the sum of squares as a function of the interpolated sample value, non-fixed point wavelet filter equations, which are differentiable, will be used. For notational clarity, the interpolated value for x(2n) will be represented as I in the following equation defining the sum of squares function:

$$Sum = \left[-\frac{1}{4}x(2n-2) + \frac{2}{4}x(2n-1) - \frac{1}{4}I\right]^2 +$$
$$\left[-\frac{1}{4}I + \frac{2}{4}x(2n+1) - \frac{1}{4}x(2n+2)\right]^2$$
$$= \frac{1}{16}[x(2n-2)]^2 - \frac{1}{4}x(2n-2)x(2n-1) + \frac{1}{8}x(2n-2)I +$$
$$\frac{1}{4}[x(2n-1)]^2 - \frac{1}{4}x(2n-1)I + \frac{1}{16}I^2 + \frac{1}{16}I^2 - \frac{1}{4}Ix(2n+1) +$$
$$\frac{1}{8}Ix(2n+2) + \frac{1}{4}[x(2n+1)]^2 - \frac{1}{4}x(2n+1)x(2n+2) +$$
$$\frac{1}{16}[x(2n+2)]^2$$
$$= \frac{1}{8}I^2 + \left[\frac{1}{8}x(2n-2) - \frac{1}{4}x(2n-1) - \frac{1}{4}x(2n+1) + \frac{1}{8}x(2n+2)\right]$$
$$I - \frac{1}{4}x(2n-2)x(2n-1) + \frac{1}{4}[x(2n-1)]^2 + \frac{1}{4}[x(2n+1)]^2 -$$
$$\frac{1}{4}x(2n+1)x(2n+2) + \frac{1}{16}[(2n+2)]^2$$

This sum of squares is minimized by:

$$\hat{x}(2n) = I = -\frac{1}{2}x(2n-2) + x(2n-1) + x(2n+1) - \frac{1}{2}x(2n+2)$$

This interpolation can be interpreted as an average of the extrapolation of the slopes from both sides. This equation will apply directly for the variation where the sample x(2n+2) is not a null. However, when x(2n+2) is a null, the replacement value for x(2n) is determined without knowledge of the replacement value for x(2n+2). As noted above, this direct approach (as opposed to an approach which simultaneously determines the replacement values for x(2n) and x(2n+2)) is typically advantageous in terms of simplicity and avoidance of a potentially growing set of simultaneous equations. Operating without knowledge of x(2n+2), that sample, i.e., x(2n+2), (as well as the associated slope information) is eliminated from the upper indices, so that the interpolating term from the upper indices comes from a single valid sample x(2n+1). Taking both variations for x(2n+2) into account, the interpolating equation becomes:

$$\hat{x}(2n) =$$
$$\begin{cases} -\frac{1}{2}x(2n-2) + x(2n-1) + x(2n+1) - \frac{1}{2}x(2n+2), & x(2n+2) \neq \text{NULL} \\ -\frac{1}{2}x(2n-2) + x(2n-1) + \frac{1}{2}x(2n+1), & x(2n+2) = \text{NULL} \end{cases}$$

This approach also extends to the situation where the even-indexed null at location 2n is the penultimate coefficient at the end of a line (i.e., $n_{max}=2n+1$), followed by a single valid sample in the last sample of the line. In this situation, the interpolating term from the upper indices comes from a single valid sample x(2n+1) so that the interpolating equation becomes:

$$\hat{x}(2n) = -\frac{1}{2}x(2n-2) + x(2n-1) + \frac{1}{2}x(2n+1)$$
$$= -\frac{1}{2}x(2n-2) + x(2n-1) + \frac{1}{2}x(n_{max})$$

Typically, the situation where an even-indexed null occurs at the second location in a line, preceded by a single valid sample in the first location, is not of concern. This situation will not commonly arise since most images start with the upper left corner located at index (0,0), which leads to even-indexed samples at the start of each line in both dimensions at all resolution levels. It is noted, however, that JPEG 2000 images may depart from this convention for images that are located at an arbitrary location on an image canvas such as, for example, an image that may be cropped in the transform domain resulting in an upper left corner which is not located at index location (0,0). As such, in instances in which an even-indexed null occurs at the second location in a line, preceded by a single valid sample in the first location, the same methodology as that described above in conjunction with the processing of an even-indexed null sample being the penultimate coefficient at the end of a line followed by a single valid sample may be employed with the equations described above simply being mirrored.

The detail and approximation coefficients associated with null post values are modified, or at least modification is considered, at each stage or resolution of a forward wavelet transform. When the wavelet transform reaches the final approximation subband, any remaining null post values may be replaced using bilinear interpolation (or extrapolation at the edges). While this final coarse resolution interpolation is not necessary from the standpoint of quantization effects on valid samples, it should slightly reduce the coding cost, and will facilitate the display of the interpolated image. Note, however, that the interpolations will seldom be displayed, since the null map will normally be overlaid on the reconstructed image prior to display. After interpolation has been performed at all resolution levels, the final interpolated image will be generated by applying the inverse wavelet transform to the interpolated wavelet decomposition.

Using the interpolation method described above, the overall compression process can be described as follows with reference to FIG. 12. The image data 10, e.g., elevation data, is scanned for the locations of null posts. The locations of the null posts may be identified, such as in a map, e.g., a null map. See block 12. In order to further the compression objectives, the map or other representation of the locations of the null post may be encoded, such as by a combination of run length coding and entropy coding. See block 14. Other encoding techniques can be employed if desired.

Thereafter, a modified forward wavelet transform is performed as described above and as shown in block 16 in order to replace wavelet coefficients associated with null posts with values which will reduce quantization effects and maintain or improve compression performance. An inverse wavelet transform is applied as shown in block 18 to the result of the modified forward wavelet transform in order to produce an interpolated image in which the null posts have been interpolated with appropriate values.

A lossy wavelet-based compression technique, such as JPEG 2000 or the EagleEye™ wavelet-based compression algorithm utilized by The Boeing Company, is then used to compress the interpolated image. See block 20. In instances in which the locations of the null posts have also been encoded, the compressed representation of the locations of the null posts may be appended to the compressed image file. The compressed file can then be stored, transferred or the like more readily.

In one alternative embodiment, the modified forward wavelet transform employed to provide processing of null posts may be directly incorporated within the wavelet-based compression algorithm. This is equivalent to omitting the inverse wavelet transform applied in block 18 and proceeding directly to quantization and encoding of the modified wavelet coefficients.

The originally described approach of generating a modified image in which the null post values are replaced has the advantage that the handling of null posts is isolated within preprocessing and post-processing operations which do not require direct modification of existing wavelet-based compression algorithms such as EagleEye and JPEG 2000. This allows this method to be used in conjunction with existing wavelet codecs without directly modifying the codec software, but instead using the null post handling software as a "wrapper" around the existing codecs. The second approach has the advantage that it reduces computation by eliminating an extra stage of the inverse wavelet transform (to produce the interpolated image) and the forward wavelet transform (within the wavelet-based compression algorithm).

In order to decompress an image file that has been compressed in accordance with embodiments of the present invention, the compressed representation of the locations of the null posts may initially be separated from the compressed image file, as shown in FIG. 13. A wavelet-based decompression algorithm corresponding to that utilized the compress the image may then be employed decompress and reconstruct the interpolated image data. See block 30. The compressed representation of the null posts may also be decoded and the original values of the null posts are then overlaid upon the proper locations within the resulting image, thereby replacing the replacement values that were previously determined during compression. See blocks 32 and 34. As described above, the method, apparatus and computer program product of the various embodiments of the present invention therefore recover the original image as shown in block 36 while eliminating the undesirable effects due to quantization of null posts and improving the performance of the compression algorithm.

As shown in FIG. 14, the apparatus 40 of embodiments of the present invention is typically embodied by a processing element 42 and an associated memory device 44, both of which are commonly comprised by a computer or the like. In this regard, the method of embodiments of the present invention as set forth generally in FIGS. 12 and 13 can be performed by the processing element executing a computer program instructions stored by the memory device. The memory device may also store the initial image data as well as the intermediate and final results of the foregoing compression and decompression processes. The computer can include a display 46 for presenting the image and any other information relative to performing embodiments of the method of the present invention.

According to one aspect of the present invention, the apparatus of embodiments of the present invention generally operates under control of a computer program product according to another aspect of the present invention. The computer program product for performing the methods of embodiments of the present invention includes a computer-readable storage medium, such as the non-volatile storage medium, and computer-readable program code portions, such as a series of computer instructions, embodied in the computer-readable storage medium.

In this regard, FIGS. 12 and 13 are flowcharts of methods, systems and program products according to exemplary embodiments of the present invention. It will be understood that each block or step of the flowchart, and combinations of blocks in the flowchart, can be implemented by computer program instructions. These computer program instructions may be loaded onto a computer or other programmable apparatus to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A method of preparing image data comprising a plurality of data values for compression, the method comprising:
   identifying locations of one or more data values of a first subset of data values;
   subjecting the image data to a forward wavelet transform that generates transformed image data that includes at least one coefficient associated with each respective data value;
   replacing the at least one coefficient associated with the one or more data values of the first subset with respective replacement coefficients, wherein replacing the at least one coefficient comprises reducing a mean squared value over the coefficients associated with the one or more data values of the first subset; and
   subjecting the transformed image data including the replacement coefficients to an inverse wavelet transform to generate modified image data.

2. The method according to claim 1 further comprising compressing the modified image data in accordance with wavelet-based image compression.

3. The method according to claim 2 wherein compressing the image data comprises subjecting the image data to a forward wavelet transform, optionally quantizing the coefficients including the replacement coefficients, and encoding the coefficients, after they have been optionally quantized.

4. The method according to claim 1 wherein reducing the mean squared value comprises minimizing the mean squared value over the coefficients associated with the one or more data values of the first subset.

5. The method according to claim 1 wherein replacing the at least one coefficient further comprises determining the replacement coefficients by interpolating from other adjacent coefficients.

6. The method according to claim 1 wherein subjecting the image data to the forward wavelet transform comprises generating both detail coefficients and approximation coefficients, and wherein replacing the at least one coefficient comprises replacing the detail coefficient associated with an odd-indexed data value of the first subset with a replacement coefficient of zero.

7. A computer program product for preparing image data comprising a plurality of data values to be compressed, the computer program product comprising at least one non-transitory computer-readable storage medium having computer-readable program code portions stored therein, the computer-readable program code portions comprising:
 a first executable portion for identifying locations of one or more data values of a first subset of data values;
 a second executable portion for subjecting the image data to a forward wavelet transform that generates transformed image data that includes at least one coefficient associated with each respective data value;
 a third executable portion for replacing the at least one coefficient associated with the one or more data values of the first subset with respective replacement coefficients, wherein the third executable portion includes instructions for replacing the at least one coefficient by reducing a mean squared value over the coefficients associated with the one or more data values of the first subset; and
 a fourth executable portion for subjecting the transformed image data including the replacement coefficients to an inverse wavelet transform to generate modified image data.

8. The computer program product according to claim 7 further comprising a fifth executable portion for compressing the modified image data in accordance with wavelet-based image compression.

9. The computer program product according to claim 8 wherein the fifth executable portion also includes instructions for optionally quantizing the coefficients including the replacement coefficients and encoding the coefficients, after they have been optionally quantized.

10. The computer program product according to claim 7 wherein the third executable portion also includes instructions for reducing the mean squared value by minimizing the mean squared value over the coefficients associated with the one or more data values of the first subset.

11. The computer program product according to claim 7 wherein the third executable portion also includes instructions for determining the replacement coefficients by interpolating from other adjacent coefficients.

12. The computer program product according to claim 7 wherein the second executable portion also includes instructions for generating both detail coefficients and approximation coefficients as a result of subjecting the image data to the forward wavelet transform, and wherein the third executable portion also includes instructions for replacing the detail coefficient associated with an odd-indexed data value of the first subset with a replacement coefficient of zero.

13. A method of subjecting image data comprising a plurality of data values to a modified forward wavelet transform, the method comprising:
 identifying locations of one or more data values of a first subset of data values;
 subjecting the image data to a forward wavelet transform that generates transformed image data that includes at least one coefficient associated with each respective data value; and
 replacing the at least one coefficient associated with the one or more data values of the first subset with respective replacement coefficients, wherein replacing the at least one coefficient comprises reducing a mean squared value over the coefficients associated with the one or more data values of the first subset.

14. The method according to claim 13 further comprising:
 optionally quantizing the coefficients including the replacement coefficients; and
 encoding the coefficients, after they have been optionally quantized.

15. The method according to claim 13 wherein reducing the mean squared value comprises minimizing the mean squared value over the coefficients associated with the one or more data values of the first subset.

16. The method according to claim 13 wherein replacing the at least one coefficient further comprises determining the replacement coefficients by interpolating from other adjacent coefficients.

17. The method according to claim 13 wherein subjecting the image data to the forward wavelet transform comprises generating both detail coefficients and approximation coefficients, and wherein replacing the at least one coefficient comprises replacing the detail coefficient associated with an odd-indexed data value of the first subset with a replacement coefficient of zero.

* * * * *